United States Patent [19]
Zarembowitch

[11] Patent Number: 5,295,162
[45] Date of Patent: Mar. 15, 1994

[54] DIGITAL DEMODULATOR WHICH QUANTIZES SIGNAL COMPONENTS ACCORDING TO DIFFERENT THRESHOLDS

[75] Inventor: Alain Zarembowitch, Katwijk, Netherlands

[73] Assignee: Agence Spatiale Europeenne, Paris, France

[21] Appl. No.: 704,275

[22] Filed: May 22, 1991

[30] Foreign Application Priority Data

May 29, 1990 [FR] France ................ 90 06646

[51] Int. Cl.$^5$ .................... H03D 3/00; H04L 27/22
[52] U.S. Cl. ........................ 375/83; 375/85; 375/86; 329/304
[58] Field of Search ............ 375/27, 83, 95, 86, 375/77, 96, 98, 97, 122, 85, 52; 341/132; 329/356, 304

[56] References Cited

U.S. PATENT DOCUMENTS

| | | | |
|---|---|---|---|
| 4,241,454 | 12/1980 | Snell et al. | 375/88 |
| 4,726,043 | 2/1988 | Levesque | 375/96 |
| 4,773,083 | 9/1988 | Baumbach et al. | 375/10 X |

Primary Examiner—Curtis Kuntz
Assistant Examiner—Tesfaldet Bocure
Attorney, Agent, or Firm—Fitzpatrick, Cella, Harper & Scinto

[57] ABSTRACT

There is disclosed a digital demodulator for the demodulation of an m-phase shift keying modulated signal. The demodulator comprises a sampling and quantizing circuit which samples and quantizes in-phase and in-quadrature components of the modulated analog signal and a carrier recovery circuit for reconstructing the carrier. The sampling and quantizing circuit quantizes the in-phase and in-quadrature components by means of a number of different quantization thresholds. This device is used in communications systems, particularly terrestrial and satellite microwave links and computer-to-computer links.

8 Claims, 3 Drawing Sheets

FIG. 4

DIGITAL DEMODULATOR WHICH QUANTIZES SIGNAL COMPONENTS ACCORDING TO DIFFERENT THRESHOLDS

BACKGROUND OF THE INVENTION

1. Field of the Invention

The present invention concerns a novel circuit for the demodulation of m-Phase Shift Keying (m-PSK) modulated signals.

2. Description of the Related Art

Phase-Shift Keying (PSK) modulation is widely used to transmit binary data by means of such communication links as terrestrial and satellite microwave links, and computer-to-computer links. The demodulation circuit necessitated by this type of modulation contributes significantly to the overall complexity of receiving equipment. Furthermore, it is widely recognised that a digital implementation is preferable to an analog implementation on the basis of performance insensitivity to environment, performance reproducibility, production costs, integration level and reliability. Consequently, a fully digital demodulation circuit is desirable for demodulating PSK-modulated signals.

Certainly, digital demodulating circuits have already been constructed in the past. However, the techniques employed until now exhibit one major constraint: the sampling rate and the clock frequency of the synchronous digital circuitry must be at least an order of magnitude (usually sixteen to thirty-two times) greater than the rate of the symbols to be demodulated. Conversely, the maximum symbol rate achievable by a digital demodulation circuitry is at least an order of magnitude lower than the maximum clock signal rate achievable by a given technology (CMOS, ECL, etc . . . ).

In practice, this type of fully digital demodulator is used for low data rate signals. High data rate signals required partly or fully analog demodulation circuitry.

Known demodulators for phase shift keying modulated signals comprise substantially a sampling and quantization circuit for sampling and quantizing the analog signal and a carrier recovery circuit for reconstructing the carrier to be served for demodulating the received signal. Known demodulators can be classified into two classes.

The first class includes those demodulators which process input signals whose center frequency is greater than the modulation symbol rate. One-bit quantization of the intermediate frequency signal is compatible with low demodulation losses provided that the sampling frequency is at least an order of magnitude larger than the carrier frequency. This type of demodulator does not need automatic gain control and implements a fully digital carrier tracking loop, which loop reconstructs the carrier by adding or skipping cycles of the master clock. The ratio of master clock frequency to modulation symbol rate determines the phase resolution of the carrier tracking loop and consequently affects the demodulation losses. A ratio of thirty-two results in a carrier phase error as large as 11 degrees. Although the circuit is simple in terms of implementation, its main limitation resides in the requirement for a master clock being several times faster than the modulation symbol rate.

The second class of digital demodulators includes those demodulators which process the in-phase I and the in-quadrature Q components of the baseband input signals. The main limitation of this type of demodulator is that it must include external analog components such as voltage controlled oscillators and gain controlled amplifiers. Furthermore, these external circuits need analog control signals and thus require digital-to-analog conversion circuitries.

SUMMARY OF THE INVENTION

The object of this invention is to provide a digital demodulator for demodulating phase shift keying modulated signals being able to operate at a clock rate no greater than the modulation symbol rate, and without requiring for external circuitries, neither for the automatic gain control nor for the carrier phase-lock.

In accordance with the invention, there is provided a digital demodulator comprising a sampling and quantization circuit for sampling and quantizing the in phase and the in-quadrature components of the modulated analog input signal and a carrier recovery circuit for reconstructing the carrier serving for demodulating the input signal, which demodulator is remarkable in that the sampling and quantization circuit quantizes the aforesaid components by means of a number of different quantization thresholds.

The digital demodulator is also remarkable in that it further comprises a combinational logic circuit for converting once per clock period the quantized values of the in-phase and in-quadrature components into two integer values in polar coordinates, deterministically associated with each set of quantized values, and an adjusting circuit for comparing a binary signal representing the quantized amplitude value with a reference amplitude value and for generating an output signal serving for the dynamic adjustment of the quantization thresholds.

An exemplary embodiment of the sampling and quantization circuit comprises two quantizers providing a plurality of amplitude quantization steps, whereby each step of the first quantizer receives the in-phase component of the input signal and a different threshold voltage and whereby each step of the second quantizer receives the in-quadrature component of the input signal and a different threshold voltage.

In the digital demodulator of the invention, the number of amplitude quantization steps is at least thirty-two, the number of amplitude quantization thresholds at least sixteen and the number of phase quantization steps at least sixty-four. The number of phase quantization steps is a multiple of four.

The digital demodulator according to the invention presents the following advantages:

1) Uniform phase quantization of the modulated input signal is performed by means of a non-uniform quantization of the amplitude of the I and Q components;
2) The automatic gain control is performed by dynamic adjustment of the quantization thresholds;
3) The quantization thresholds for both the I and Q components of the input signal are generated by a single and common resistive network;
4) Sampling is performed at a rate as low as one sample per modulation symbol during the tracking mode;
5) The quantized phase samples are processed entirely in digital implementation by simple functional elements (counters, comparators, adders);
6) The master clock (which determines both the sampling clock and the digital signal processing clock) can be generated by a dynamic adjustment of one of the phase shifted versions of a fixed frequency local oscillator and that dynamic adjustment of the phase shift between the master clock and the local oscillator can be performed by a symbol clock recovery circuit;

7) Two four-bit quantizers make it possible to achieve demodulation losses lower than 0.5 dB over the range of bit error rate extending from $10^{-2}$ to $10^{-5}$.

Furthermore, the proposed circuit is suited for compact implementation in a very large scale integrated digital circuit form (VLSI).

BRIEF DESCRIPTION OF THE DRAWINGS

The invention is described in detail hereinafter with reference of the accompanying drawings.

FIG. 4 is a block diagram illustrating the carrier reconstruction process used in an exemplary demodulator according to the invention.

DETAILED DESCRIPTION OF THE PREFERRED EMBODIMENT

Figure 1:
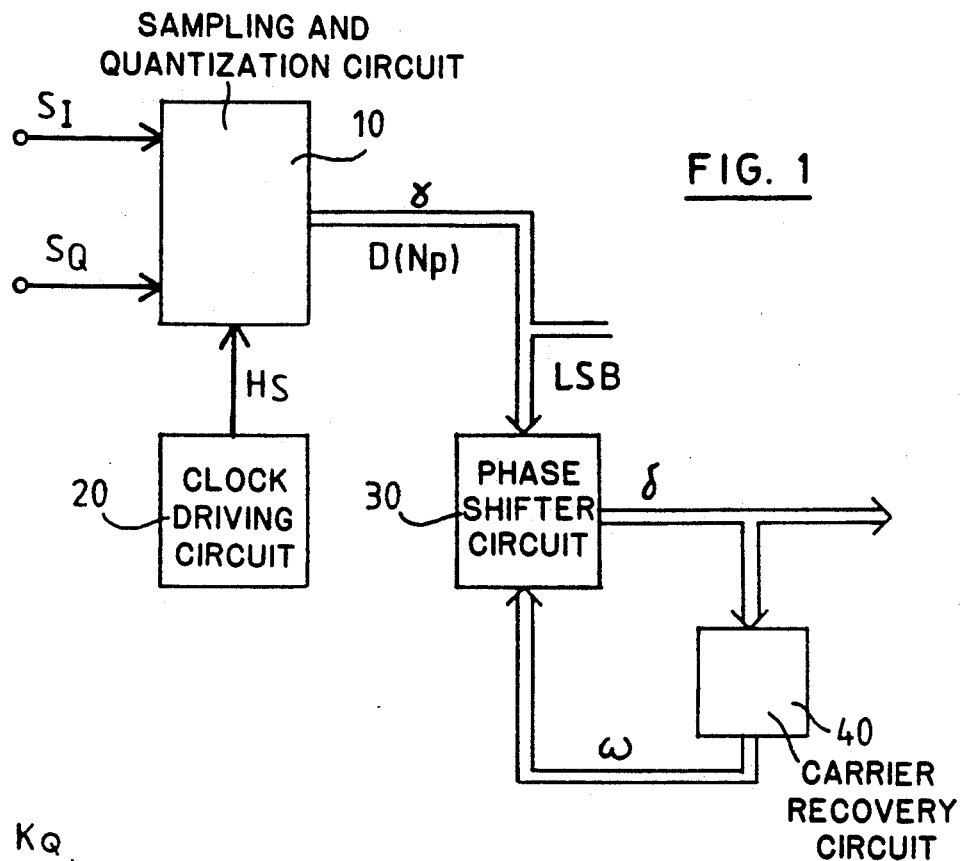
FIG. 1 is a block diagram of the digital demodulator according to the invention.

Referring to FIG. 1, the digital demodulator according to the invention comprises a phase sampling and quantization circuit 10 receiving the analog signals $S_I$ and $S_Q$ which are the in-phase and in-quadrature components of the signal obtained by amplification, filtering and frequency down-conversion of the received modulated signal. The center frequency of the input signals is the frequency $f_c$.

Figure 2:
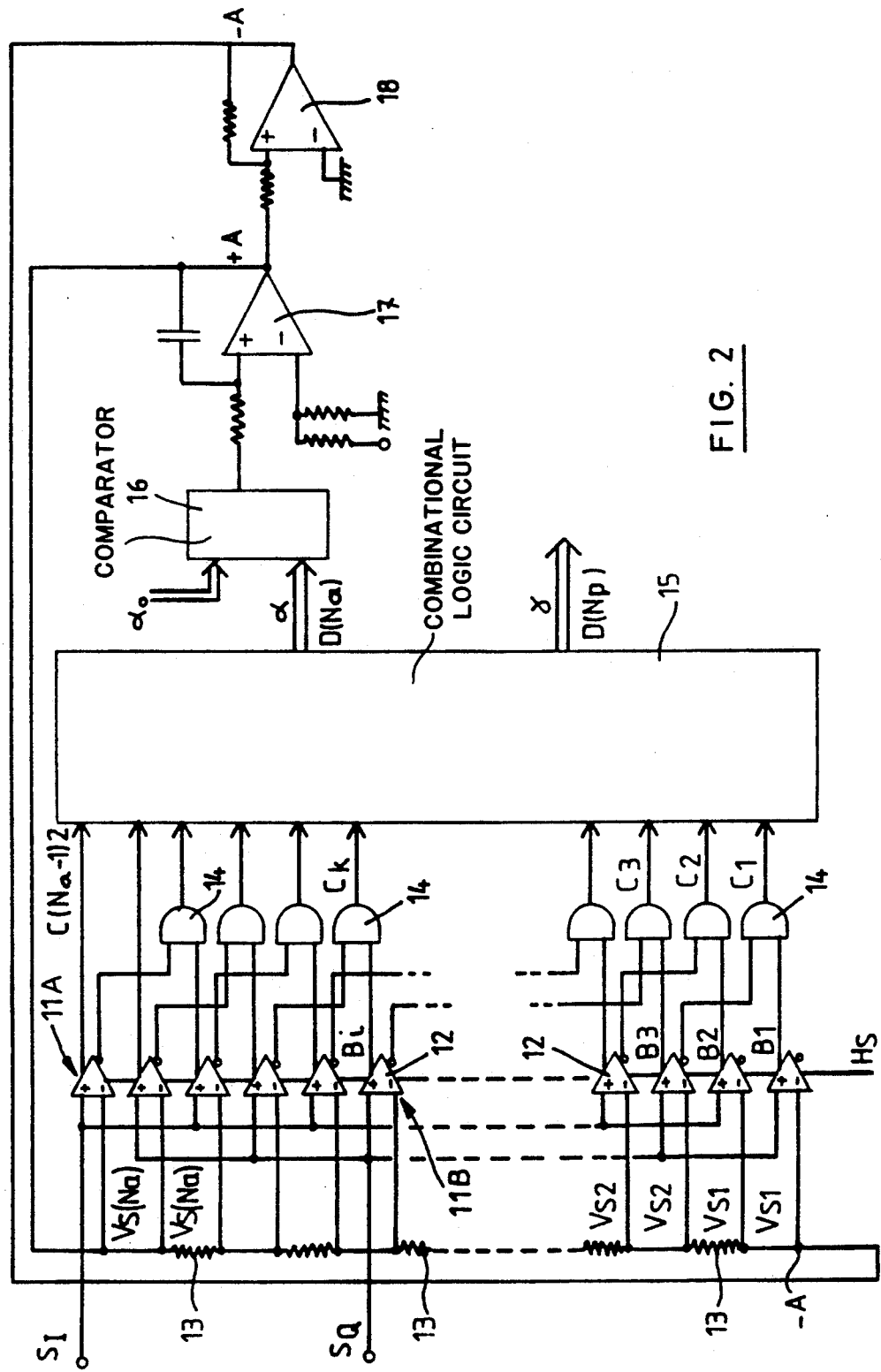
FIG. 2 is a block diagram of an exemplary embodiment of the phase sampler and quantizer according to the invention.

An exemplary embodiment of the sampling and quantization circuit 10 is illustrated in FIG. 2. The signal $S_I$ is applied to an input of a plurality of stages of a first quantizer 11A, while signal $S_Q$ is applied to an input of a plurality of stages of a second quantizer 11B.

Each stage of both quantizers is comprised of a comparator 12. The positive input port of the comparator is connected for receiving the input voltage $S_I$ or $S_Q$ and its negative input port is connected for receiving a different threshold voltage Vsi.

Each comparator 12 generates a "high" output signal if and only if the voltage applied to its positive input port is larger than the threshold voltage applied to its negative input port. Otherwise, the output signal is a "low". Bi will denote the output signal from the comparator in stage i.

The output signal Bi from each comparator from the stage with the lowest threshold voltage and the inverted output signal (Bi+1) from the comparator in the next stage are combined in an AND-circuit 14 which produces a signal Ci representing the logical product Ci=Bi.AND.NOT(Bi+1). In addition, the logical signal C(Na−1)/2 from the upper stage is equal to the output signal from the upper stage comparator. In this way, at any time, one and only one logical signal Ck is a high state, while all the others are low states. The integer K hereafter designates the quantized value of the analog input signal.

The two quantizers have identical transfer characteristics and the non uniform input voltage thresholds are set by the following relationship:

$$Vsi = 0.5 * A * (\sin(2\pi i/Np) + \sin(2\pi(i+1)/Np))$$

for $i = -(Na-1)/2, -(Na-1)/2 +$ $$1, \ldots, -1, 0, 1, 2, \ldots, (Na-1)/2$$

where

Na is the odd number of quantization steps

A is a scaling signal

Np is the number of desired phase quantization steps, and is related to Na by the relationship Np=4(Na−1).

In this manner, the thresholds Vsi are located exactly in the middle between the respective projections on a cartesian axis of two successive phase quantization steps Pi=i * $2\pi$/Np and Pi+1. It should be noticed that only those quantized phase states whose projection an a cartesian axis is smaller than $\sin(\pi/4)$ in absolute value are separated by voltage thresholds on that axis. In this way, each quantized phase step on the circle of amplitude A in the complex plane is assigned a unique couple of quantized amplitude values on the in-phase and in-quadrature channels.

Because both quantizers 11A and 11B have identical transfer characteristics, each quantizer requires an identical set of non uniform threshold voltages Vsi. In the specific arrangement of FIG. 2, the (Na−1) quantization voltage thresholds Vsi are generated by a voltage divider comprising (Na-2) serially connected resistances 13. The voltages applied to both voltage divider ends are +A and −A.

In the course of the quantization process, the sampling is performed synchronously with sampling clock signals Hs generated, formatted and phased properly by a suitable clock driving circuit 20.

The quantized and sampled values $K_I$ and $K_Q$ of the analog signals $S_I$ and $S_Q$ respectively are synchronous with the clock signals Hs.

Once per clock signal period Hs, a cartesian-to-polar coordinates conversion is performed on the values $K_I$ and $K_Q$ by means of a combinational logic circuit 15. That circuit generates two integer values alpha ($\alpha$) and gamma ($\gamma$) associated deterministically with each set of quantized values $K_I$ and $K_Q$. The amplitude o is the sum of the absolute values of $K_I$ and $K_Q$. The amplitude value $\alpha$ is represented by a binary word of D(Na) bits and the phase value $\gamma$ is represented by a binary word of D(Np) bits. The numbers D(n) are the minimum numbers of bits needed for representing different values.

The phase value $\gamma$ is determined by considering the circle of radius A in the complex plane. The complex plane is partitioned into $Na^2$ rectangular areas (see FIG. 3) and each elementary area is identified by two amplitude values $K_I$ and $K_Q$. For each point of cartesian coordinates (x,y) in a given elementary area, there is a phase in polar coordinates and to that elementary area corresponds an average phase. The Np phase quantization steps are arranged uniformly around the circumference. Accordingly, the integer phase value $\gamma$ associated to a given elementary area ($K_I$, $K_Q$) is defined by the index i of the quantized phase state Pi which is the closest to the average phase on the considered elementary area.

The phase Y is an integer value between 0 and Np-1. The selection of the quantization thresholds Vsi as previously defined ensures that to each one of the phase quantization states Pi on the circle of amplitude A in the complex plane corresponds a unique couple of amplitude valves ($K_J$, $K_Q$).

The binary word with amplitude $\alpha$ is applied to an input of a comparator 16 in which it is compared with a reference amplitude word $\alpha o$. The comparator 16 is arranged for producing an output signal which takes a high state when $\alpha$ is less than $\alpha o$, a low state when $\alpha$ is greater than $\alpha o$, and to provide indistinctly a high or low state in case of equality. That output signal is then compared to the average voltage between logical states "high" and "low", inverted and integrated in the integrator 17. The integration time constant is determined by the product R * C. The output +A from integrator 17 serves as upper voltage applied to the voltage divider 13. The output from integrator 17 is also applied to a unit gain inverter 18 which generates the opposite voltage −A, whereby the latter is used as lower voltage for the voltage divider 13.

When the amplitude of the input signal is smaller than A, the number $\alpha$ is smaller than $\alpha o$ and the input to the integrator circuit 17 is positive. Consequently the output signal A decreases because of the inverting feature, which tends to reduce the difference between the absolute value of the input signal S and value A.

In the specific case of a phase quantizer with sixty-four stages (Np=64), the digital number $\alpha$ comprises five bits. A typical value for $\alpha o$ is then 12.0. The time constant RC of the AGC loop is a system parameter which is selected in a satisfactory tradeoff between fast AGC loop acquisition speed and maximum filtering of the input signal noise.

In effect, the loop circuit acts as an automatic gain control. Instead of controlling the amplification gain of the input signals $S_I$ and $S_Q$ as is customary in known automatic gain control circuits, the circuit of the invention dynamically adjusts the quantization threshold voltages Vsi. This circuit can advantageously be implemented in an integrated form, it alleviates the need for an external control circuit and it minimizes the effect of gain mismatch between the amplifiers receiving the in-phase and the in-quadrature signal components because the quantization threshold voltages Vsi are common to both quantizers 11A and 11B.

The quantization circuit of the invention implements approximately a uniform sampling and quantization of the modulo-$2\pi$ phase of the input signal. When the input signal consists of a signal in the form S=A cos ($\delta(t)$), which is the case of a noiseless PSK modulated signal, an exact equivalence exists between the desired uniform phase quantization and the circuit of the invention, which comprises two non-linear amplitude quantizers.

The number Np of phase quantization steps is a circuit design parameter. The invention requires the number Np to be a multiple of four. The number of phase quantization steps plays a significant role in the overall losses of the demodulator. In the particular case of QPSK modulation, losses below 0.5 dB can be achieved when the number of quantization steps is greater than or equal to sixty-four. Equivalently, a number of voltage comparators of at least thirty-two and a number of quantization thresholds of at least sixteen are needed to keep implementation losses lower than 0.5 dB.

For purpose of illustration, a phase quantizer having sixty-four steps and an input signal amplitude A is considered. The seventeen quantization levels are defined as follows:

| Outputs | Inputs |
|---|---|
| K = −8 | S < −A * 0.67075 |
| K = −7 | −A * 0.67075 < S < −A * 0.59498 |
| K = −6 | −A * 0.59498 < S < −A * 0.51348 |
| K = −5 | −A * 0.51348 < S < −A * 0.42704 |
| K = −4 | −A * 0.42704 < S < −A * 0.33648 |
| K = −3 | −A * 0.33648 < S < −A * 0.24269 |
| K = −2 | −A * 0.24269 < S < −A * 0.14655 |
| K = −1 | −A * 0.14655 < S < −A * 0.04901 |
| K = 0 | −A * 0.04901 < S < +A * 0.04901 |
| K = 1 | +A * 0.04901 < S < +A * 0.14655 |
| K = 2 | +A * 0.14655 < S < +A * 0.24269 |
| K = 3 | +A * 0.24269 < S < +A * 0.33648 |
| K = 4 | +A * 0.33648 < S < +A * 0.42704 |
| K = 5 | +A * 0.42704 < S < +A * 0.51348 |
| K = 6 | +A * 0.51348 < S < +A * 0.59498 |
| K = 7 | +A * 0.59498 < S < +A * 0.67075 |
| K = 8 | +A * 0.67075 < S |

Figure 3:
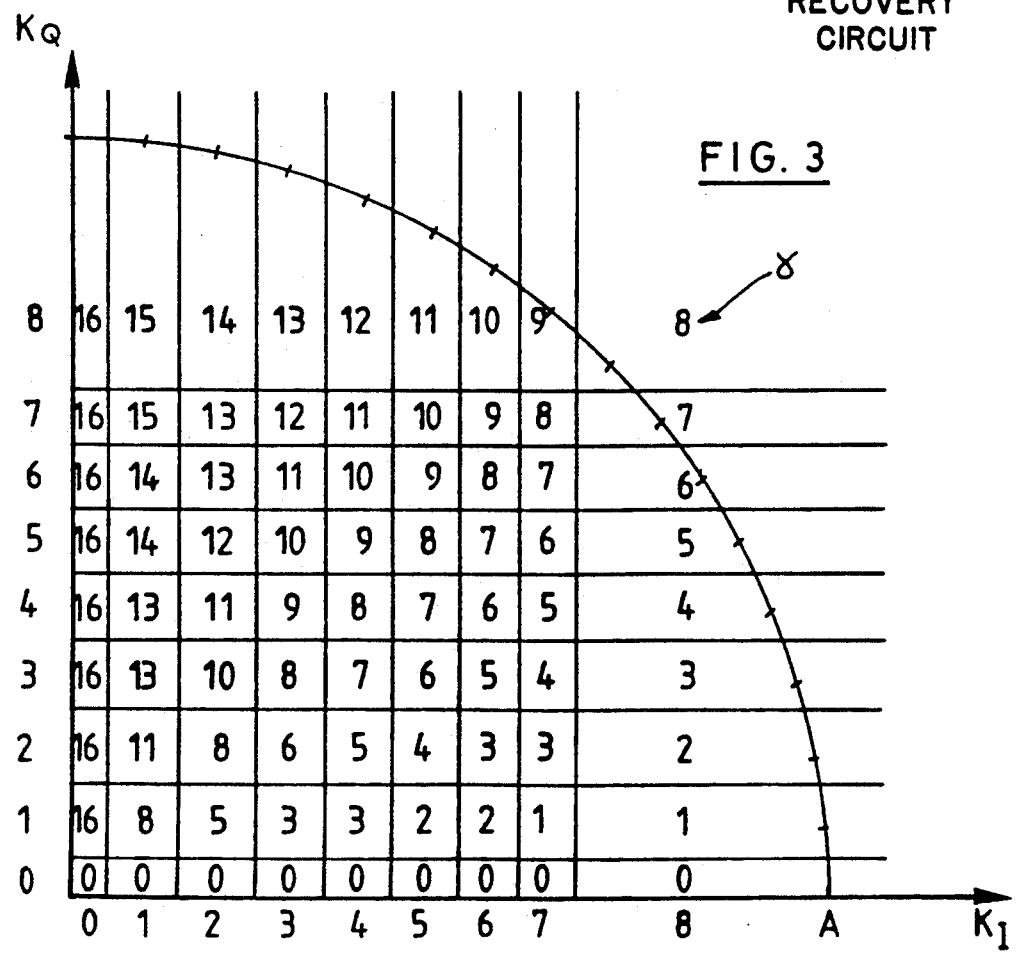
FIG. 3 is a diagram illustrating the quantizing process carried out in the demodulator according to the invention.

For the sake of clarity, in the table above, the threshold values have been rounded to the fifth digit. The quantized phase is a deterministic function of the coordinates ($K_J$, $K_Q$) as shown in the diagram of FIG. 3.

Reverting to the general schematic diagram of the demodulator of the invention (FIG. 1), the binary phase word $\gamma$ representing the quantized phase is padded with "low" state bits on the least significant bit side for greater accuracy in the subsequent phase shift. The resulting word $\gamma$ comprising D(Np') bits is fed into a phase shifter circuit 30 in which it is added to a phase-shifted phase correction word omega ($\omega$) produced once per Hs clock period at the output of a carrier recovery circuit described hereafter. At the output from circuit 30, there is produced a binary word delta ($\delta$). The words $\gamma'$, $\omega$ and 67 have the same representation: they are positive integers taking values k ranging from 0 to Np'−1, and representing the quantized phase steps k * $2\pi$/Np.

In effect, the digital circuit 30 performs a modulo-$2\pi$ addition of the input signal phase, represented by the word $\gamma'$, and the phase shift, represented by the word $\omega$. Its function is to down-convert the input signal from its center frequency $f_c$ to baseband. This device accommodates as well positive as negative phase shifts. A negative phase shift −v is represented by its modulo-2 positive equivalent, i.e. k * $2\pi$−v, where k is the smallest integer for which k * $2\pi$−v becomes positive.

The word $\delta$ produced at the output of phase shifter circuit 30 represents the quantized samples of the phase of the received signal and after phase shifting. The demodulated data are contained in the D(m) most significant bits of the word $\delta$. The remaining bits serve for giving an estimation of the phase error as will be explained hereafter.

The successive words $\delta$ representing quantized samples of the phase of the received signal are applied to a carrier recovery circuit 40. The function of the latter is that of a conventional carrier recovery circuitry and depends on the mode of operation:

In the acquisition mode, the circuit 40 searches for the presence of a modulated signal among the noisy received signal.

Therefore, it sweeps the receiver center frequency between two extreme frequencies fmin and fmax with frequency steps $f_s$. The frequency sweep waveform comprises a succession of linear frequency ramps. Upon detection of a modulated signal, the circuit 40 reconfigures itself automatically from acquisition mode to tracking mode.

In the tracking mode, the circuit 40 estimates and reconstructs the carrier phase of the modulated signal. It then outputs a sequence of phase shift words ω representing the opposite of the reconstructed carrier phase. This sequence of words ω is used to control the aforesaid digital phase-shifter 30. The combined functions of the phase-shifter 30 and of the carrier recovery circuit 40 create a digital phase-lock loop. The carrier recovery circuit continuously evaluates whether the loop is locked or not and outputs the estimated phase error for each symbol. The estimated phase error is a measure of the confidence degree about the demodulated data or in other words of the degree of trust which can be given to the demodulated data. Upon persistent loss of lock, the circuit automatically reconfigures itself to resume into acquisition mode.

Figure 4:
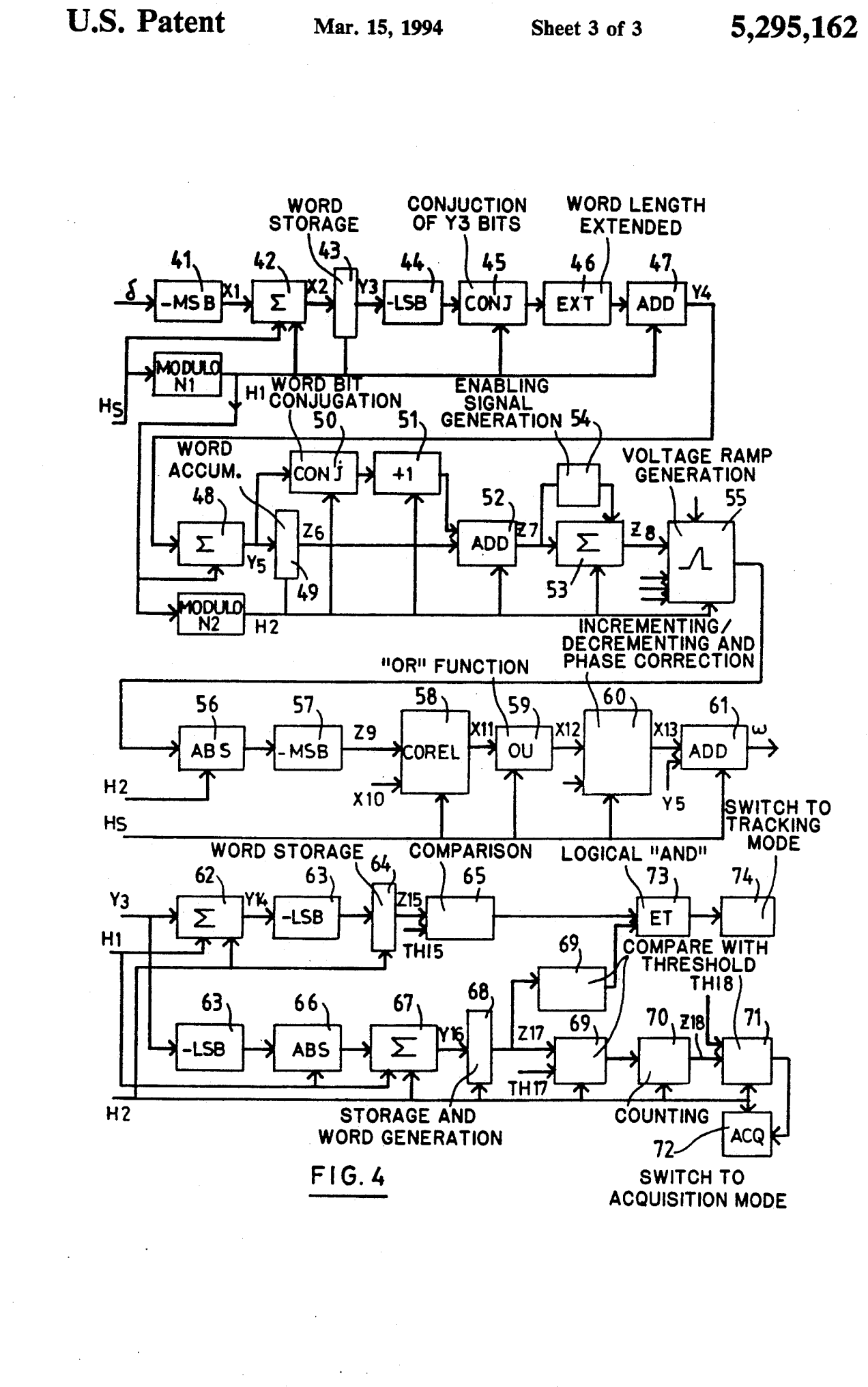

It is to be noted that the specificity of the carrier recovery circuit of the invention does not reside in its function but in he data processing scheme it performs. This fully digital processing scheme according to the invention is shown in the block diagram of FIG. 4.

During the aforesaid processing, there is generated three sets of binary words respectively identified by symbols X, Y and Z. The binary words Xi are updated once per Hs master-clock signal period. The binary words Yi are updated once per H1 clock period obtained by dividing the frequency of the master-clock by N1. The parameter N1 is an integration constant of the quantized samples of the received signal phase. The binary words Zi are updated once per H2 clock period obtained by dividing the frequency of signal H1 by N2. The parameter N2 is an integration constant used in the frequency tracking process.

Once per Hs clock period, the word δ is truncated of several of its most significant bits MSB (step 41).

The number of truncated bits depends on the number of modulation phases, i.e. D(m) bits in the case of m-PSK modulation.

N1 successive samples of the resulting word X1 are accumulated (step 42) and the result is stored in the word X2. The number N1 is a processing system parameter and it is preferably equal to a power of two. Upon completion of the word X2, it is stored into the word Y3 (step 43). The word Y3 represents the average phase correction.

Once per H1 clock period, the word Y3 is processed for generating a word Y5 representing the cumulative phase correction during a tracking process in response to a phase error. The word Y5 is achieved by means of the following steps:

Block 44: The word Y3 is truncated of a number D(N1) of least significant bits LSB.
Block 45: The remaining bits of Y3 are conjugated.
Block 46: The length of the resulting word is extended with D(m) 0 bits in least significant binary position.
Block 47: A constant value $1 + 7Np'/8$ is added for generating a word Y4.
Block 48: The word Y4 is accumulated since the start of the tracking mode for generating the word Y5.

The cumulative phase correction word Y5 is one of the components of the phase correction word ω used in the digital phase shifter 30. The second component of the phase correction word ω is a word X13 representing the cumulative phase correction since the start of a tracking process in response to a frequency error. The word X13 is achieved by means of the following operations:

Block 49: Accumulating the word Y5 once per H2 clock period for generating a word Z6.
Block 50: Conjugating the bits of the word Y5.
Block 51: Adding one.
Block 52: Adding Y5 and Z6 and generating a word Z7.
Block 53: Accumulating the word Z7 in word Z8 representing an estimation of the carrier frequency.
Block 54: Generating an enabling signal if the absolute value of Z7 is greater than a threshold TH7.
Block 55: Generating a voltage ramp.
Block 56: Forming and storing the absolute value of Z8.
Block 57: Eliminating the most significant bits MSB and generating a word Z9.
Block 58: Correlation process on the bits of X11.
Block 59: ORing function on the bits of X11.
Block 60: Incrementing/decrementing counting and generating the phase correction word X13. If X12 is 1 and the most significant bit of Z8 is 1, X13 decreases by one.

The phase correction words X13 and Y5 are added (step 61) for generating the phase correction word ω to be used for the control of the phase-shifter 30.

On the other hand, the binary word Y3 which represents the average phase correction is also used for controlling the system working mode by means of the following operations:

Block 62: Accumulating N2 samples of Y3 at the rate of once per H1 clock period.
Block 63: Eliminating some least significant bits LSB so as to simplify the circuitries.
Block 64: Storing the word Z15 representing a measure of the average phase error on N1 N2 samples of the input signal.
Block 65: Comparison with a threshold TH15.
Block 66: Achieving the absolute value of the Ni samples of Y3.
Block 67: Accumulating the samples of Y3 in the word Y16.
Block 68: Storing and generating the word Z17 representing a measure of the standard deviation of the phase error.
Block 69: Comparison with a threshold TH17.
Block 70: Counting of Z18. If Z17 is greater than TH17, Z18 is incremented by 1, otherwise Z18 is reset to 0. Z18 indicates the number of successive H2 clock periods in the detection sequence.
Block 71: Comparison of Z18 with a threshold TH18. If Z18 is greater than TH18, the phase detection is satisfactory and the system reconfigurates itself automatically into acquisition mode.
Block 72: Switching into acquisition mode.
Block 73: Logical ANDing Z15 and Z17.
Block 74: Switching into tracking mode if the value of Z15 is greater than TH15 and if the value of Z17 is less than TH17.

Briefly, among the binary words generated in the processing scheme carried out according to the invention the following words have a particular meaning:

Y3 represents the average phase correction;
Y5 represents the cumulative phase correction during a tracking process in response to a phase error;
X13 represents the cumulative phase correction during a tracking process in response to a frequency error;
Z8 represents an estimate of the carrier frequency;
Z15 is a measure of the average phase error on N1 N2 samples of the received signal;
Z17 is a measure of the standard deviation of the phase error.

The binary words Y5 and X13 constitute the two components of the phase correction word w which controls the digital phase shifter 30 mentioned previously.

The transition from Acquisition mode to Tracking mode happens automatically if and only if both the following conditions are met:

a) the value of Z15 is greater than a set positive integer threshold TH15, and b) the value of Z17 is less than a set positive integer threshold TH17.

A low value for Z17 indicates that a modulated signal is present and that its carrier frequency is in the frequency acquisition band of the circuit. Further, the transition from a negative value to a positive value for Z15 indicates that the value of the word Z8 (which represents an estimate of the carrier frequency) just has exceeded the carrier frequency of the received modulated signal. As soon as these two conditions are met, the carrier recovery circuit of the invention is ensured that the acquisition of correct carrier frequency has been performed, i.e. reconstructed automatically, and it reconfigures itself automatically into tracking mode. All the registers and accumulators of the circuit, except the accumulator which generates Z8, are then reset to zero. The process as described makes it possible to achieve a correct carrier frequency acquisition, even when the input signal is modulated with data.

The exemplary embodiment described in the foregoing is an example given by way of illustration and the invention is in no way limited to that example. Any modification, variation or equivalent arrangement should be considered to be within the scope of the invention.

I claim:

1. A digital receiver apparatus for the demodulation of a multi-state phase shift keying modulated signal comprising:

first sampling and quantizing means having a plurality of first quantization elements connected and arranged to receive the in-phase component of a modulated analog input signal and to produce quantized samples of said in-phase component according to different quantization thresholds, second sampling and quantizing means having a plurality of second quantization elements connected and arranged to receive the in-quadrature component of said modulated analog input signal and t produce quantized samples of said in quadrature component according to said different quantization thresholds, said first and second sampling and quantizing means being constructed and arranged to produce quantized samples of the phase of the received signal, and a carrier recovery circuit connected to receive signals corresponding to the quantized samples of the phase of the received signal to reconstruct the carrier for demodulating the received signal.

2. An apparatus according to claim 1, wherein the quantization elements of the first sampling and quantizing means are connected to a voltage divider which establishes different quantization thresholds for said first quantization elements, and wherein the second quantization elements are connected to the same voltage divider.

3. An apparatus according to claim 1, wherein the number of said first and second quantization elements is at least thirty two, the total number of said quantization thresholds is at least sixteen and wherein said first and second sampling and quantization means are constructed and arranged to generate phase quantization values in response to outputs from at least sixty four different combinations of said first and second elements.

4. An apparatus according to claim 1, wherein said first and second sampling and quantization means are constructed and arranged to generate a number of phase quantization values, which number is a multiple of four.

5. An apparatus according to claim 1, wherein said first and second sampling and quantization means are constructed and arranged to generate a first binary word representing an integer value corresponding to the sum of the amplitudes of said quantized sampled of said in-phase and in-quadrature outputs and to produce a second binary word representing an integer value which is deterministically assigned to represent the average phase represented by said quantized samples of the phase of the received signal, and adjusting means for comparing said first binary word with a reference amplitude word and for generating an output signal for the dynamic control of said quantization thresholds.

6. An apparatus according to claim 5, wherein said apparatus comprises means to generate a third binary signal representing a phase correction word, and a digital phase-shifter constructed and connected to receive said second binary signal and said third binary signal to generate an output binary word representing the quantized phase samples of a phase shifted received signal, and wherein the most significant bits of said output binary word correspond to demodulated data from said received signal.

7. An apparatus according to claim 6, wherein said output binary word further includes less significant bits, and wherein said apparatus further includes a digital phase-lock loop responsive to said less significant bits for generating a sequence of binary phase correction words to control the phase shift of said digital phase shifter.

8. An apparatus according to claim 7, further including tracking means constructed and connected to provide a tracking process in response to a phase error signal which corresponds to said phase correction word, wherein a first portion of the phase correction word represents phase correction signals cumulated during such tracking process in response to a phase error and wherein another portion of the phase correction word represents phase correction signals cumulated during said tracking process in response to a carrier frequency error being detected.

* * * * *

UNITED STATES PATENT AND TRADEMARK OFFICE
CERTIFICATE OF CORRECTION

PATENT NO. : 5,295,162
DATED : March 15, 1994
INVENTOR(S) : ALAIN ZAREMBOWITCH

It is certified that error appears in the above-indentified patent and that said Letters Patent is hereby corrected as shown below:

THE TITLE PAGE

At [56] References Cited, insert
--FOREIGN PATENT DOCUMENTS
A124187    6/1968    Netherlands--.

COLUMN 2

Line 12, "for" (first occurrence) should be deleted.
Line 16, "in phase" should read --in-phase--.

COLUMN 3

Line 55, "signal (Bi+1)" should read --signal ($\overline{Bi+1}$)--.
Line 67, "non uniform" should read --non-uniform--.

COLUMN 4

Line 17, "an" should read --on--.
Line 26, "non uniform" should read --non-uniform--.
Line 45, "amplitude o" should read --amplitude $\alpha$--.
Line 50, "different" should read --phase $\gamma$--.
Line 65, "phase Y" should read --phase $\gamma$--.

COLUMN 5

Line 2, "valves" should read --values--.

COLUMN 6

Line 28, "word $\gamma$" should read --word $\gamma'$--.
Line 34, "ωand 67" should read --w and $\delta$--.

UNITED STATES PATENT AND TRADEMARK OFFICE
CERTIFICATE OF CORRECTION

PATENT NO. : 5,295,162               Page 2 of 2
DATED      : March 15, 1994
INVENTOR(S): ALAIN ZAREMBOWITCH It is certified that error appears in the above-indentified patent and that said Letters Patent is hereby corrected as shown below:

COLUMN 7

Line 11, "symbol" should read --symbol.--.
Line 19, "he" should read --the--.

COLUMN 9

Line 2, "word w" should read --word ω--.
Line 49, "t" should read --to--.
Line 50, "in quadrature" should read --in-quadrature--.

COLUMN 10

Line 10, "thirty two," should read --thirty-two,--.
Line 14, "sixty four" should read --sixty-four--.
Line 24, "sampled" should read --samples--.

Signed and Sealed this

Sixteenth Day of May, 1995

Attest:

BRUCE LEHMAN

Attesting Officer        Commissioner of Patents and Trademarks